United States Patent
Stoler et al.

(10) Patent No.: US 11,222,123 B2
(45) Date of Patent: Jan. 11, 2022

(54) SECURING PRIVILEGED VIRTUALIZED EXECUTION INSTANCES FROM PENETRATING A VIRTUAL HOST ENVIRONMENT

(71) Applicant: CyberArk Software Ltd., Petach-Tikva (IL)

(72) Inventors: Nimrod Stoler, Zoran (IL); Lavi Lazarovitz, Ramat Gan (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/390,542

(22) Filed: Apr. 22, 2019

(65) Prior Publication Data
US 2020/0334362 A1    Oct. 22, 2020

(51) Int. Cl.
*G06F 21/57* (2013.01)
*G06F 9/455* (2018.01)

(52) U.S. Cl.
CPC ........ *G06F 21/577* (2013.01); *G06F 9/45558* (2013.01); *G06F 2009/45587* (2013.01); *G06F 2009/45591* (2013.01); *G06F 2009/45595* (2013.01)

(58) Field of Classification Search
CPC ............ G06F 21/57; G06F 21/53; G06F 8/20; G06F 21/577; G06F 9/45558; G06F 2009/45587; G06F 2009/45591; G06F 2009/45595; H04L 63/0245; H04L 63/104
USPC ......................................................... 726/25
See application file for complete search history.

(56) References Cited

U.S. PATENT DOCUMENTS

| | | |
|---|---|---|
| 7,849,502 B1 | 12/2010 | Bloch et al. |
| 8,813,233 B1 | 8/2014 | Wilson et al. |
| 9,104,859 B1 | 8/2015 | Banerjee |
| 9,729,579 B1 * | 8/2017 | Marino ................. H04L 63/123 |
| 9,805,190 B1 | 10/2017 | Roth et al. |
| 10,375,121 B2 * | 8/2019 | Hamou ................... H04L 67/10 |

(Continued)

OTHER PUBLICATIONS

Communication and Extended European Search Report dated Dec. 5, 2019, issued from the European Patent Office in corresponding Application No. 19177788.7-1218 (8 pages).

(Continued)

*Primary Examiner* — Bryan F Wright
(74) *Attorney, Agent, or Firm* — Finnegan, Henderson, Farabow, Garrett & Dunner, LLP

(57) ABSTRACT

Disclosed embodiments relate to systems and methods for identifying vulnerabilities for virtualized execution instances to escape their operating environment and threaten a host environment. Techniques include identifying a virtualized execution instance configured for deployment on a host in a virtual computing environment; performing a privileged configuration inspection for the virtualized execution instance, the privileged configuration inspection analyzing whether the virtualized execution instance has been configured with one or more attributes that can permit operation of the virtualized execution instance to perform operations, beyond an environment of the virtualized execution instance, on an environment of the host; and implementing, based on the privileged configuration inspection, a control action for controlling the virtualized execution instance's ability to perform operations on the environment of the host.

20 Claims, 7 Drawing Sheets

(56) References Cited

U.S. PATENT DOCUMENTS

| | | | |
|---|---|---|---|
| 10,404,579 B1 | 9/2019 | Biemueller et al. | |
| 2009/0133001 A1* | 5/2009 | Rozenfeld | G06F 8/20 |
| | | | 717/127 |
| 2009/0249457 A1 | 10/2009 | Graff et al. | |
| 2010/0122343 A1* | 5/2010 | Ghosh | G06F 21/55 |
| | | | 726/23 |
| 2013/0268757 A1 | 10/2013 | Kulkarni et al. | |
| 2014/0082350 A1 | 3/2014 | Zarfoss, III et al. | |
| 2015/0163206 A1* | 6/2015 | McCarthy | H04L 63/104 |
| | | | 713/171 |
| 2015/0269383 A1* | 9/2015 | Lang | G06F 21/57 |
| | | | 726/1 |
| 2015/0324571 A1 | 11/2015 | Hernoud et al. | |
| 2016/0359955 A1 | 12/2016 | Gill et al. | |
| 2017/0116415 A1 | 4/2017 | Stopel et al. | |
| 2017/0134476 A1 | 5/2017 | Palanivel et al. | |
| 2017/0147811 A1* | 5/2017 | Angelsmark | G06F 21/554 |
| 2017/0279826 A1 | 9/2017 | Mohanty et al. | |
| 2017/0289109 A1 | 10/2017 | Caragea | |
| 2017/0300430 A1 | 10/2017 | Kataria et al. | |
| 2018/0027006 A1* | 1/2018 | Zimmermann | H04L 63/0245 |
| | | | 726/11 |
| 2018/0095739 A1 | 4/2018 | Baset et al. | |
| 2018/0144123 A1* | 5/2018 | Levin | G06F 21/53 |
| 2019/0392150 A1 | 12/2019 | Shevade et al. | |

OTHER PUBLICATIONS

Jim Fisher, How to create an SSH certificate authority, https://jameshfisher.com/2018/03/16/how-to-create-an-ssh-certificate-authority/ (6 pages).

Using a CA with SSH, https://www.lorier.net/docs/ssh-ca.html (3 pages).

Jérôme Petazzoni, ~jpetazzo/If you run SSHD in your Docker containers, you're doing it wrong!, https://jpetazzo.github.io/2014/06/23/docker-ssh-considered-evil/ (6 pages).

Cyberark, Threat Research Blog Post, How I Hacked Play-with-Docker and Remotely Ran Code on the Host, Nimrod Stoler (Jan. 14, 2019).

* cited by examiner

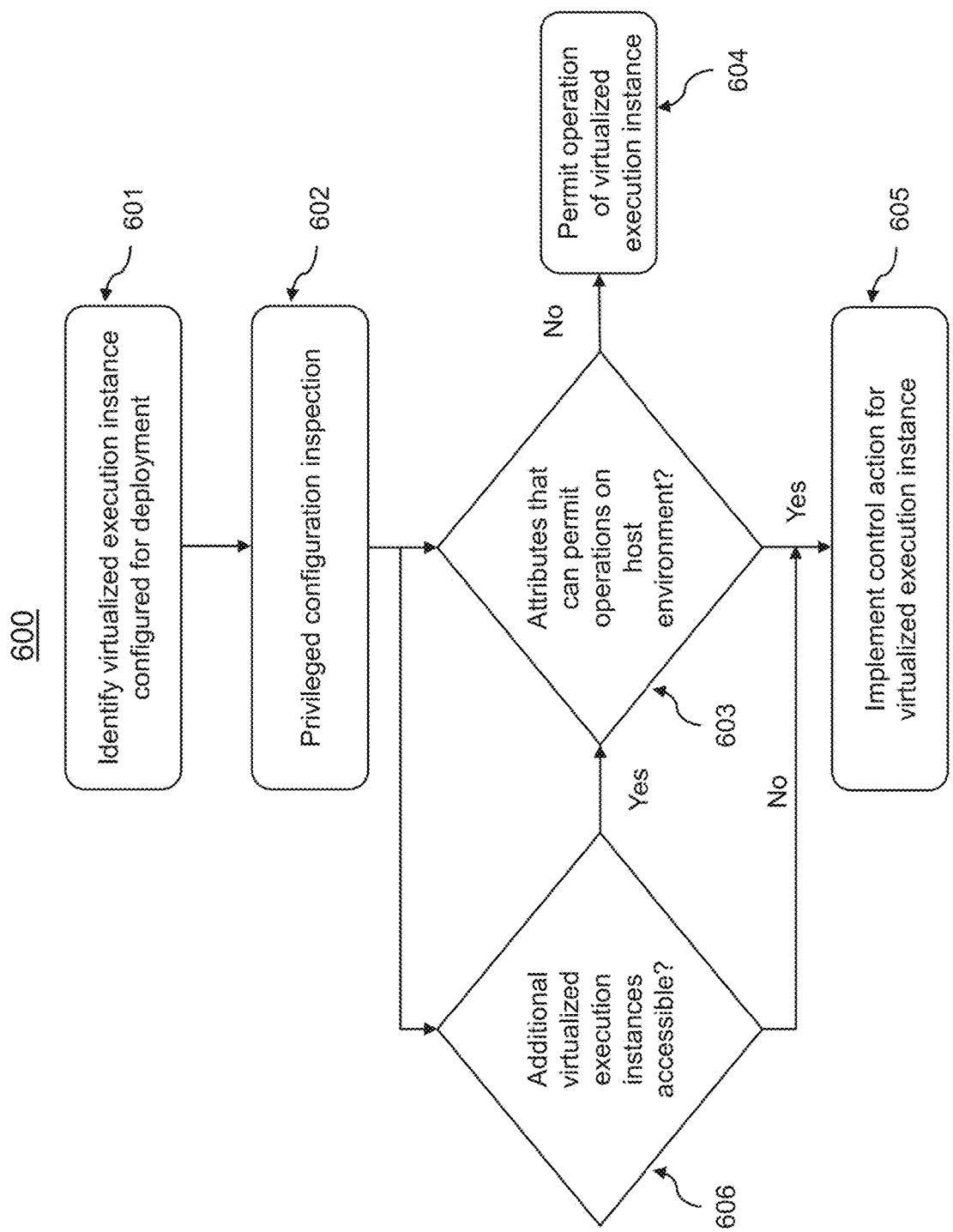

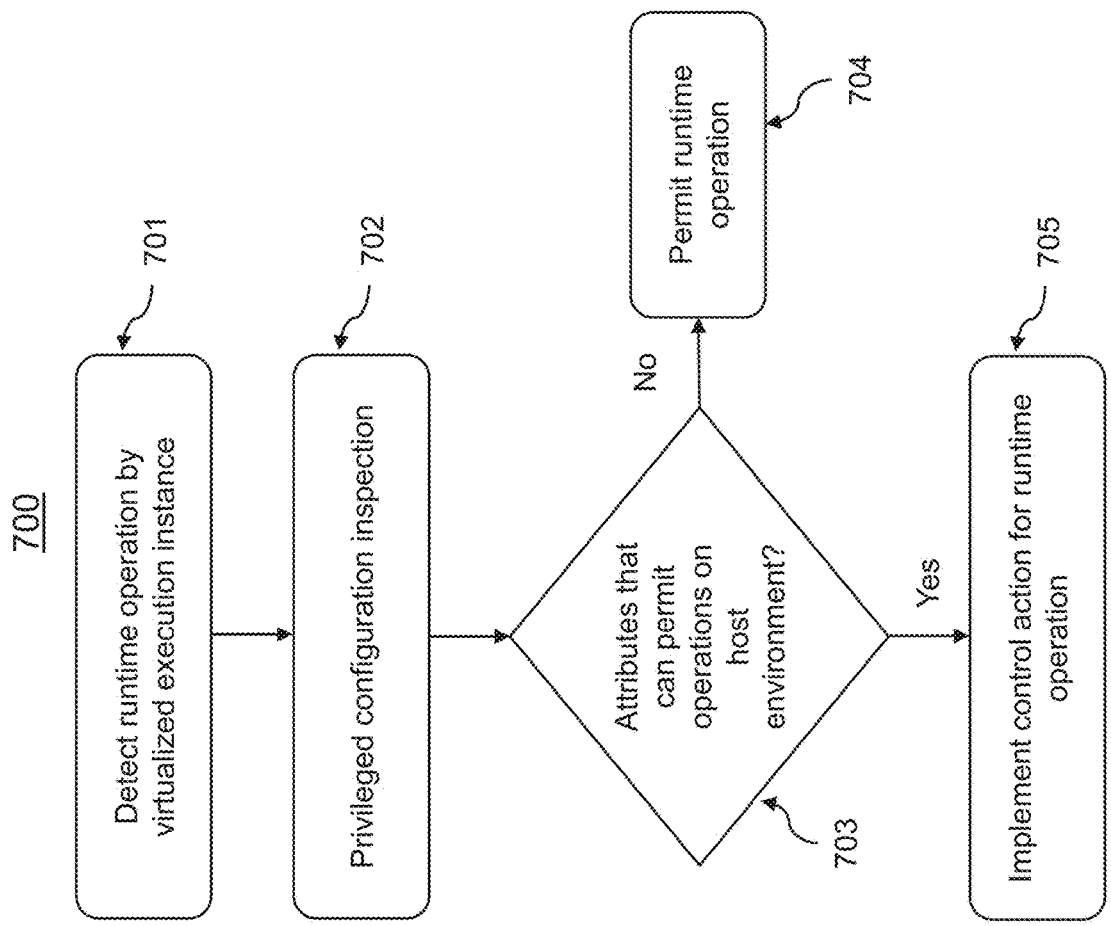

SECURING PRIVILEGED VIRTUALIZED EXECUTION INSTANCES FROM PENETRATING A VIRTUAL HOST ENVIRONMENT

BACKGROUND

In recent years, there has been increasing movement away from traditional on-premises computer networks toward cloud-based or virtual computer networks. Use of virtual machines, containers, and even serverless code has proliferated and become an integral part of IT infrastructure for all types of businesses, government agencies, and educational institutions. Through platform offerings such as Software-as-a-Service (SaaS), Infrastructure-as-a-Service (IaaS), and Platform-as-a-Service (PaaS), enterprises and other institutions are able to remotely store, process, and access data and software to run their operations.

At the same time, efficient and flexible development and deployment processes for software have become increasingly popular. Practices such as DevOps, continuous integration, and continuous deployment have been more prevalently used by enterprises and other entities to shorten the time between code changes and code deployment, resulting in more agile and optimized software products and services. Many of these practices are integrated into cloud-based, virtual computing environments.

The expanding use of virtualized computing frameworks presents significant security risks. From the perspective of the enterprise using a virtualized network, there are risks that their applications may be wrongfully accessed, modified, or used. Examples include privilege escalation attacks, denial of service attacks, corporate espionage, and others. From the cloud host's perspective, additional risks include attackers escalating privileges such that they can gain access to the host system itself. When an attacker can, for example, "escape" from a virtual machine or container and penetrate the underlying host system, the attacker can potentially cause widespread damage throughout the entire host system, potentially affecting numerous enterprises using the host for cloud services. From the perspective of individuals and entities having sensitive or confidential data stored in the cloud, additional risks are that their data may be improperly accessed, improperly shared, or improperly deleted.

Accordingly, in view of the significant security vulnerabilities that arise with the growing popularity of cloud-based services, technological solutions are needed for addressing the ability of users or applications to "escape" from permitted virtualized and isolated instances, and improperly penetrate host systems and other virtualized environments served by the host systems. Technological solutions are needed for identifying privileged virtual instances, which have parameters or configurations (e.g., based on flags, permissions, credentials, etc.) giving them privileged access sufficient to access an underlying host system. Existing approaches, which attempt to identify malicious communications and actions of virtual instances, are insufficient because they are unable to detect privileged virtual instances before malicious activity occurs. Such techniques are powerless to detect risks that virtual instances will exploit an underlying host system and/or other privileged instances being supported by the host system.

As described herein, technological solutions are needed to identify the attempted creation of privileged virtual instances, before they are able to penetrate host systems and cause harm to the host or other cloud-based entities served by the host. Additionally, technological solutions are needed for controlling the creation, deployment, and operations of virtual instances that may have, or may obtain, privileged capabilities. As described further below, investigative and predictive processes may be used to determine whether a virtual instance is to be deployed with privileged capabilities, or may gain such capabilities in the future. For such privileged instances, controls are provided for preventing the deployment of the instances, limiting their capabilities to remove privilege escalation risks, generating alerts or reports, or generating prompts requiring authentication (e.g., single-factor, two-factor, etc.) or authorization (e.g., from a manager, administrator, etc.).

SUMMARY

The disclosed embodiments describe non-transitory computer readable media, systems, and methods for identifying vulnerabilities for virtualized execution instances to escape their operating environment and threaten a host environment. For example, in an exemplary embodiment, there may be a non-transitory computer readable medium including instructions that, when executed by at least one processor, cause the at least one processor to perform operations for identifying vulnerabilities for virtualized execution instances to escape their operating environment and threaten a host environment. The operations may comprise identifying a virtualized execution instance configured for deployment on a host in a virtual computing environment; performing a privileged configuration inspection for the virtualized execution instance, the privileged configuration inspection analyzing whether the virtualized execution instance has been configured with one or more attributes that can permit operation of the virtualized execution instance to perform operations, beyond an environment of the virtualized execution instance, on an environment of the host; and implementing, based on the privileged configuration inspection, a control action for controlling the virtualized execution instance's ability to perform operations on the environment of the host.

According to a disclosed embodiment, the virtualized execution instance is a container instance.

According to a disclosed embodiment, the privileged configuration inspection includes identifying a second virtualized execution instance accessible to the virtualized execution instance, and analyzing whether the second virtualized execution instance has been configured with one or more attributes that can permit operations on the environment of the host.

According to a disclosed embodiment, the virtualized execution instance has not been deployed for execution in the virtual computing environment.

According to a disclosed embodiment, the one or more attributes include a configuration parameter for the virtualized execution instance.

According to a disclosed embodiment, the one or more attributes include a hardware configuration of the host.

According to a disclosed embodiment, performing the privileged configuration inspection includes using a file system debugger to attempt to access a directory of the host.

According to a disclosed embodiment, the operations further comprise, conditional on performing the privileged configuration inspection during a docker phase of the virtualized execution instance, deploying the virtualized execution instance.

According to a disclosed embodiment, the operations further comprise, conditional on performing the privileged configuration inspection upon a request to deploy the virtualized execution instance, deploying the virtualized execution instance.

According to a disclosed embodiment, the operations further comprise, conditional on performing the privileged configuration inspection upon a request to create the virtualized execution instance, deploying the virtualized execution instance.

According to another disclosed embodiment, a method may be implemented for identifying vulnerabilities for virtualized execution instances to escape their operating environment and threaten a host environment. The method may comprise identifying a virtualized execution instance configured for deployment on a host in a virtual computing environment; performing a privileged configuration inspection for the virtualized execution instance, the privileged configuration inspection analyzing whether the virtualized execution instance has been configured with one or more attributes that can permit operation of the virtualized execution instance to perform operations, beyond an environment of the virtualized execution instance, on an environment of the host; and implementing, based on the privileged configuration inspection, a control action for controlling the virtualized execution instance's ability to perform operations on the environment of the host.

According to a disclosed embodiment, the method further comprises detecting a runtime operation by the virtualized execution instance and, upon detecting the runtime operation, performing a further privileged configuration inspection for the virtualized execution instance.

According to a disclosed embodiment, the runtime operation involves an inspection of the host.

According to a disclosed embodiment, the runtime operation involves an inspection of hardware of the host.

According to a disclosed embodiment, the runtime operation involves an attempt to access a root directory of the host.

According to a disclosed embodiment, the runtime operation involves an attempt to execute code on the host.

According to a disclosed embodiment, performing the privileged configuration inspection includes using a file system debugger to attempt to access a directory of the host.

According to a disclosed embodiment, the method further comprises, conditional on performing the privileged configuration inspection during a docker phase of the virtualized execution instance, deploying the virtualized execution instance.

According to a disclosed embodiment, the runtime operation involves a write operation on the host.

According to a disclosed embodiment, the one or more attributes include a configuration parameter for the virtualized execution instance.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 6 is a flowchart depicting an exemplary process for identifying vulnerabilities for virtualized execution instances to escape their operating environment and threaten a host environment accordance with disclosed embodiments.

FIG. 7 is a flowchart depicting an exemplary process for identifying runtime activity that may allow virtualized execution instances to escape their operating environment and threaten a host environment in accordance with disclosed embodiments.

DETAILED DESCRIPTION

Figure 1:
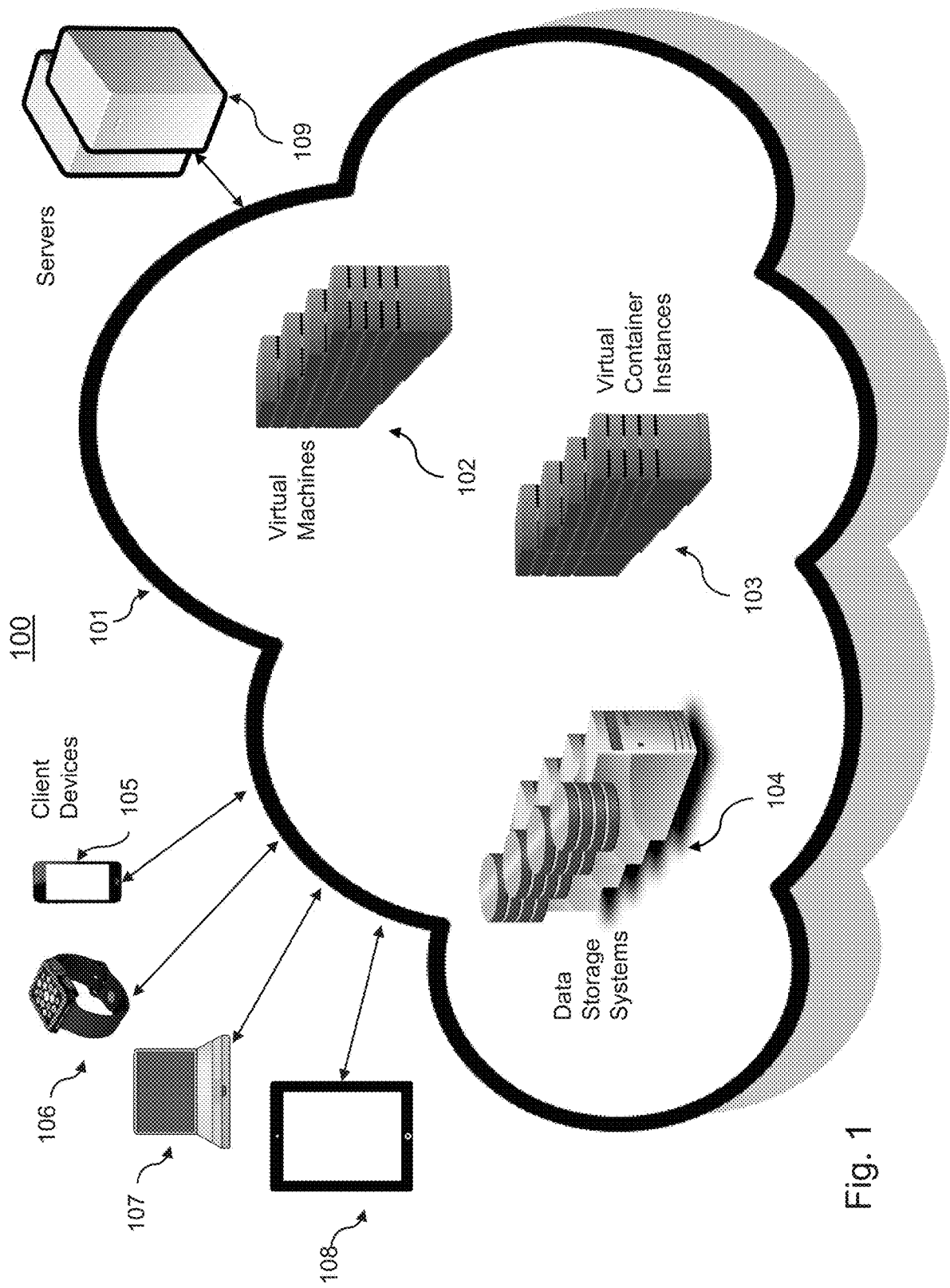
FIG. 1 is a block diagram of an exemplary system of virtualized execution instances and accessible client and server devices in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of identifying vulnerabilities for virtualized execution instances to escape their operating environment and threaten a host environment described herein overcome several technological problems relating to security, deployment, scalability, and efficiency in cloud-based virtual computing networks. In contrast to existing approaches, which focus on identifying malicious actions of active virtualized instances, the techniques disclosed herein can identify privileged virtualized instances before they are deployed and before they perform potentially insecure actions, such as exploiting a host system. As discussed further below, by analyzing virtualized instances and their configuration settings (e.g., flags, permissions, embedded credentials, etc.), it may be determined whether they have privileged capabilities that can provide access to a host system on which they are based. While existing approaches may identify improper access to a host system after it has occurred and damage has occurred, the disclosed techniques enable identification of privileged instances before they access a host system. Thus, rather than force organizations and cloud providers to react to cloud-based security breaches, the present techniques allow for preventative measures. When privileged virtual instances are identified, various types of control actions may be taken to neutralize their privileged characteristics, block their actions, monitor them, generate alerts for them, disable credentials associated with them, or require authentication, among other actions.

Notably, the disclosed techniques are effective to protect against both malicious attempts to escape a virtualized environment and penetrate a host environment, as well as accidental or merely unauthorized access to a host environment. For example, malicious attempts may involve users intentionally attempting to observe information regarding a virtual instance and its underlying host, in an effort to exploit or elevate the instance's privileges and obtain control at the host. Accidental or simply unauthorized risks may arise, for example, when developers spin-up new privileged containers purposefully (e.g., because of problems they are having with virtual processes requiring more capabilities than non-privileged instances offer) or unintentionally (e.g., by setting a privilege flag without intending to do so).

Reference will now be made in detail to the disclosed embodiments, examples of which are illustrated in the accompanying drawings.

FIG. 1 illustrates an exemplary system 100 for identifying vulnerabilities for virtualized execution instances to escape their operating environment and threaten a host environment. As illustrated, system 100 may include a cloud-based, or virtualized, network 101 that is accessible to client devices 105-108 and servers 109. In various embodiments, cloud-based network 101 may be based on various types of virtual network infrastructure, such as that provided by Amazon Web Services™ (AWS), Microsoft Azure™, IBM Cloud™, and other virtual network providers. Cloud-based network 101 may include one or more virtual machines 102, which may be based on virtualization tools provided by Amazon Web Services™ (AWS), Microsoft Azure™, IBM Cloud™, Google Cloud Platform™, Cisco Metapod™, Joyent™, vmWare™, or others. Similarly, virtualized network 101 may include one or more container instances 103, which may be based on the same types of virtualized deployment tools, Docker™ container tools, Kubernetes™, tools, or other similar containerization tools. Further, the virtual machines 102 and containers 103 may be, in some embodiments, next generation virtual instance types (e.g., Quarkus™, Ibmjava™, etc.). Cloud network 101 may also include one or more data storage systems 104. In some embodiments, virtual machines 102 and container instances 103 may access storage systems 105 to obtain data, provide data, obtain application code, provide application code, etc. Further, in some embodiments, data storage systems 105 may be part of the cloud infrastructure (e.g., part of the host system, or storage devices operating as a SaaS or IaaS platform for client devices 105-108, etc.).

In various embodiments, cloud-based network 101 may include only one type of virtualized instance (e.g., only virtual machines, only containers, etc.), while in other embodiments cloud-based network 101 includes combinations of different types of virtualized instances. Cloud-based network 101 may be a private cloud network, a public cloud network, or a hybrid private-public cloud network. Numerous types of functionality and use may be made of cloud-based network 101, such as data storage, data retrieval, application storage, application execution, computation, data backup, etc.

As illustrated, various types of client devices may be configured to access cloud-based network 101. Examples include smartphones 105, smart jewelry or clothing 106, personal computers 107, tablets 108, and others. Of course, numerous other types of client devices may access cloud-based network 101 as well (e.g., IoT sensors or devices, smart home appliances, network-connected vehicles, building security systems, home automation systems, transportation communication systems, etc.). Likewise, servers 109 may access virtualized network 101 as well. Servers 109 may be, for example, web servers, application servers, on-premises corporate servers, cloud-based servers, etc. In some embodiments, client devices 105-108 and server 109 may be part of the same cloud-based network as network 101, a different cloud-based network, or various private or on-premises networks.

Figure 2:
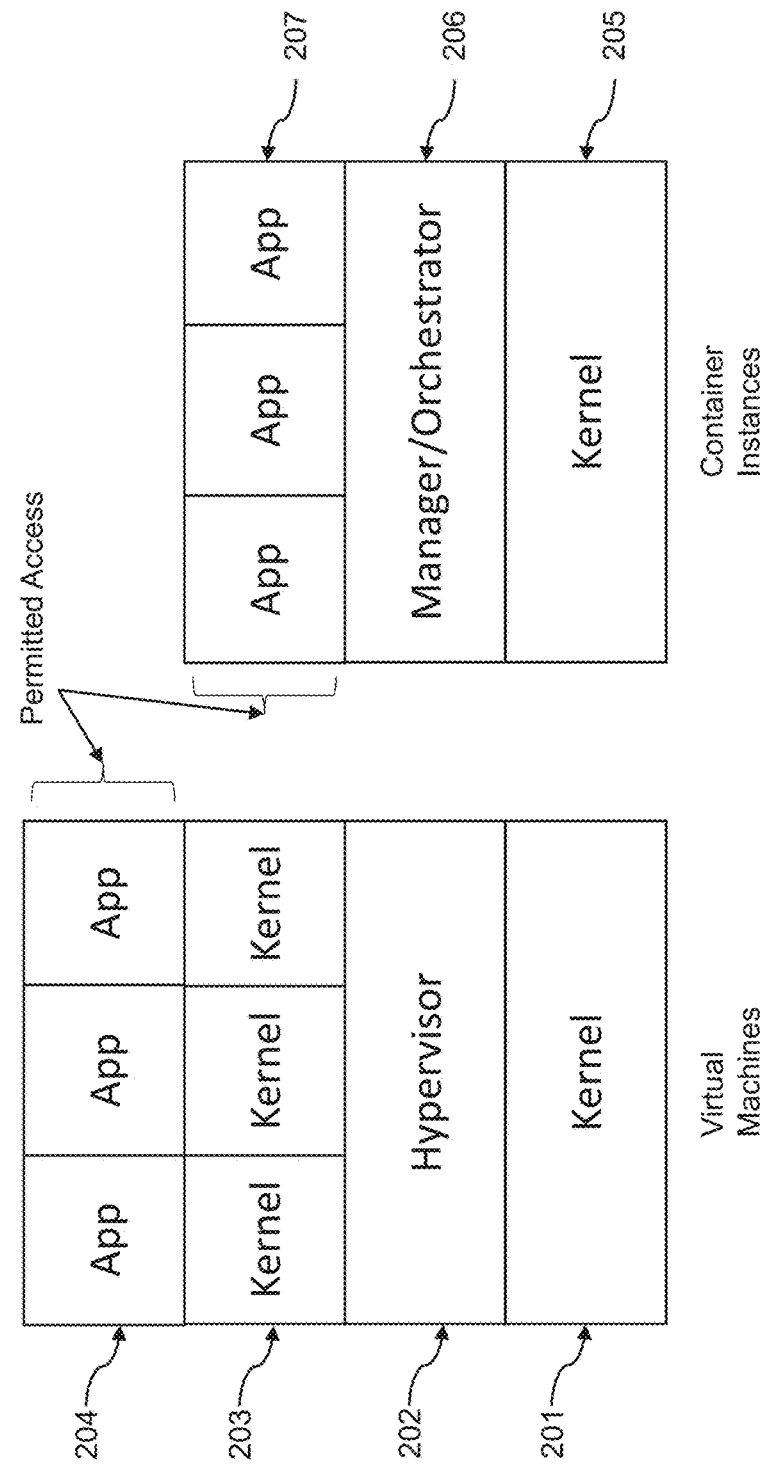
FIG. 2 is a block diagram showing an exemplary architecture of virtual machines and container instances in accordance with disclosed embodiments.

FIG. 2 is a block diagram showing an exemplary architecture 200 of virtual machines and container instances. As illustrated in FIG. 2, a virtual machine may be built or deployed based on a kernel 201, which may support a hypervisor or virtual machine manager 202. In a virtual machine framework, multiple operating system kernels 203 may be spun up to create multiple different virtual machine instances. The operating system kernels 203 may be based on whatever type of computing instance is being virtualized, such as a Microsoft Windows™ based operating system, a Linux operating system, a Unix operating system, or various other types of operating systems. Based on each kernel 203, virtualized applications 204 may be instantiated and executed as well. Users or other applications that interact with virtual machines may then interact with applications 204.

FIG. 2 also illustrates an arrangement of a virtual container instance (e.g., Docker™ container, etc.). Container instances may share a common underlying operating system kernel 205, and may be deployed and managed through a single (or multiple) manger or orchestrator tools 206. Each container instance may run one or more virtualized application 207, with which users or other applications may interact.

As discussed further below, when users or processes or applications interact with virtual machines or container instances, there is a permitted scope of access, which includes the virtualized application 204/207 and the virtualized operating system environment in which it operates. By contrast, the user, process, or application should not be able to escape from this permitted virtualized and isolated environment and penetrate the underlying host resources (e.g., hypervisor 202, manager/orchestrator 206, or kernel 201/205) or other virtual instances running on the host. As discussed further below, a virtualized instance with the capability to escape its permitted virtualized environment and perform operations (e.g., access, read, write, modify, etc.) at the host level is considered a privileged virtual instance. Privileged virtual instances may have such strong or elevated access rights through various flags or parameters that can be set when the virtualized and isolated instance is initially spun up, during a pre-instantiation phase (e.g., a DevOps development phase where a developer is configuring code for the instance, privileges of the instance, credentials of the instance, or other features, but has not yet released the instance into a live and operational environment), or after spin-up (e.g., through modification by another privileged virtual instance, or by an administrator, etc.).

As shown below in Table 1, various characteristics may differentiate privileged virtual instances from default, or non-privileged virtual instances. Of course, these characteristics are configurable and flexible, so that different classifications of privileged versus non-privileged virtual instances are possible.

TABLE 1

| Attribute or Parameter | Privileged Virtual Instance | Default Virtual Instance |
|---|---|---|
| Capabilities | ALL | Only certain ones (see Table 2, below) |
| Devices | ALL | Only minimum required devices are allowed access (see Table 3, below) |
| Kernel File System | Read/Write | Read Only |
| Seccomp | Unconfined | Default profile |
| AppArmor | Unconfined | Default profile |
| Namespace Separation to Host | ON | ON |
| User Running Container | Root | Root |
| Certain/Proc Files | Has access | Access Not Allowed |

In some embodiments, when a virtual instance is spun up, or modified by an administrator after spin-up, a privileged flag may be set for the virtual instance. For example, a privileged flag for a container instance may give the container instance all (or nearly all) capabilities, and lift all limitations that may otherwise be enforced (e.g., by a device cgroup controller). When such a privileged flag is set for the container, the container may have all (or nearly all) of the capabilities and rights that the underlying host has. The privileged flag may be set for certain intentional reasons (e.g., for the use case of running a Docker™ within Docker™), may be set through an oversight or mistake during development or spin-up of the instance, or may be set maliciously (e.g., when an attacker gains access to the virtualization or DevOps platform itself and spins up privileged container instances).

According to Table 1, above, although both containers are run by the root user, there are significant differences between a privileged virtual instance and a default (non-privileged) virtual instance. The privileged virtual instance in Table 1 is running with root privileges with all capabilities allowed. That may include CAP_SYS_ADMIN, for example, which conveys a major part of Linux root powers. Starting from kernel 2.2, Linux divides the privileges associated with a superuser into distinct units, known as capabilities, which can be independently enabled or disabled. In addition to these powers, privileged virtual instances may have access to all devices (e.g., devices operating on the host virtual platform). With the CAP_SYS_ADMIN capability, this may allow users to mount any device, and provides an attack vector to host access via mounting the host's hard drive. Other vulnerable devices are text terminal or TeleTYpewriter (TTY) devices, USB sticks, raw network data, CD ROMs, etc. For example, TTY devices are vulnerable since they may be used to inject characters into other users' TTYs, including the host's login TTYs.

By having access to the kernel file system, the host kernel (e.g., Linux kernel) may be re-configured by an attacker. For example, the attacker may accomplish this by writing certain data to the kernel file, such as: /sys/fs/cgroup/devices/devices.allow.

A root user may be able to create, read, and write to new devices, which was not previously allowed in the default virtual instance environment itself. Further, a privileged virtual instance's root user may have access to a number of files that the default virtual instance's root user does not have. These files may provide attackers a head start in their attack and expand the attack surface. One such file is: /proc/kallsyms, which contains kernel variable names and their memory addresses.

Various types of flags or parameters may provide virtual instances elevated or privileged access rights to a host system. For example, the "device flag" adds a device to the virtualized environment. As an illustration: docker run—device4dev/sda1:/dev/sda1 would add the sda1 hard disk, usually the host's disk, to the/dev directory of the new virtual instance. With respect to containers, for example, Docker™ may add this device with read/write capabilities, which allow the user inside the container to either mount the added device, or use other tools, such as dd or debugfs to further probe into the host's data. All of these tools may allow unabridged read and write access to the host's device.

As another type of flag, the "cap-add" flag adds capabilities, which may not be allowed by default, which allow the operator precise control over the capabilities set of the virtual instance. This flag may also pose security risks, such as: CAP_SYS_ADMIN, which allows the performance of a range of system administration operations (e.g., mounting new devices, sending data to other users' TTYs, etc.). Further, CAP_SYS_MODULE allows the virtual instance to load and unload kernel modules, CAP_SYS_RAWIO allows I/O port operations, CAP_SYS_TIME sets the system clock and hardware real-time clock, CAP_DAC_READ_SEARCH supports certain file read/write operations which can access host data directly, SYS_PTRACE allows the virtual instance to trace arbitrary processes using ptrace (e.g., to extract credentials from running processes on the same container), and SYS_BOOT uses reboot and kexec_load to reboot and load a new kernel for later execution. SYS_BOOT allows an attacker inside the virtual instance to eventually replace the kernel with their own kernel.

A further type of flag is the "device-cgroup-rule" flag, which is a more implicit flag of Docker™ containers that instructs the kernel (e.g., Linux kernel) to allow creation of new devices in the container. Although it may seem that no new devices are present in the container, with the "device-cgroup-rule" flag a user may still be able, covertly, to create such a device, exploit its content, and then dispose of it, leaving no visible marks inside the container. An example of using this flag is: docker run—it—device-cgroup-rule "b 8:1 rwm". This example sets up a seemingly default virtual instance but with the ability to create, read, and write from a block device (b) type 8:1. The block 8:1 device may be the main hard disk of certain Linux systems, which practically allows the virtual instance to access all the data on the host's hard drive for read or write actions.

As a further example, the "v flag" may allow an attacker to gain privileged access to the host's system using the Docker™ volume mount method. This method supports mounting all or a part of the host's file-system, including/proc and/dev for example, into the virtual instance. This also includes mounting the Docker™ socket itself, which is the Unix socket that the Docker™ daemon listens on by default, and can be used to communicate with the daemon from within a virtual instance, which generally means that the virtual instance has total control over the host.

A further particularly potent flag is the "pid flag." For example, an operator can instruct Docker™ to setup a virtual instance running in the same PID namespace of the host. The following line: docker run—privileged—pid=host ubuntu sets up a virtual instance, which not only is using the "privileged flag," but also uses the same PID namespace as the host. This means that the virtual instance practically has access to all processes running on the host as root, and can use: nsenter -p {pid}-a to insert the PID number of any of the host's processes in this command, and the virtual instance switches to the host's namespaces. This gives the virtual instance the same privileges as any other root process running on the host, and practically removes all the security walls and isolation between the virtual instance and the host.

Other types of privileged virtual instances include containers that include the "ipc=host" and "net=host" flags. These flags instruct, for example, Docker™ to share IPC (Interprocess Communications) or Network namespaces with the host.

With reference to the capabilities that may differentiate default from privileged virtual instances, as noted in Table 1, Table 2 below provides more detail on such capabilities, which may be considered capabilities associated with a default or non-privileged instance.

TABLE 2

| Capability Type | Capability Description |
| --- | --- |
| SETPCAP | Modify process capabilities |
| MKNOD | Create special files using mknod(2) |
| AUDIT_WRITE | Write records to kernel auditing log |
| CHOWN | Make arbitrary changes to file UIDs and GIDs |
| NET_RAW | Use RAW and PACKET sockets |
| DAC_OVERRIDE | Bypass file read, write, and execute permission checks |
| FOWNER | Bypass permission checks on operations that normally require the file system UID of the process to match the UID of the file |
| FSETID | Don't clear set-user-ID and set-group-ID permission bits when a file is modified |
| KILL | Bypass permission checks for sending signals |
| SETGID | Make arbitrary manipulations of process GIDs and supplementary GID list |
| SETUID | Make arbitrary manipulations of process UIDs |
| NET_BIND_SERVICE | Bind a socket to internet domain privileged ports (e.g., port numbers less than 1024) |
| SYS_CHROOT | Use chroot(2), change root directory |
| SETFCAP | Set file capabilities |

With regard to the device types noted above in connection with FIG. 1, Table 3 includes more detail on the types of devices that may be considered to differentiate privileged from non-privileged virtual instances, which as shown below may be associated with a default or non-privileged instance.

TABLE 3

| Device Name | Major:Minor | Description |
| --- | --- | --- |
| Console | C 136:0 | First Unix98 pseudo-TTY |
| Full | C 1:7 | Returns ENOSPC on write |
| Random | C 1:8 | Nondeterministic random number generator |
| TTY | C 5:0 | Current TTY device |
| Urandom | C 1:9 | Faster, less secure random number generator |
| Zero | C 1:5 | Null byte source |
| Null | C 1:3 | Null device |
| Console | C 5:1 | System console |
| Ptmx | C 5:2 | PTY master multiplex (TTY) |

Figure 3:
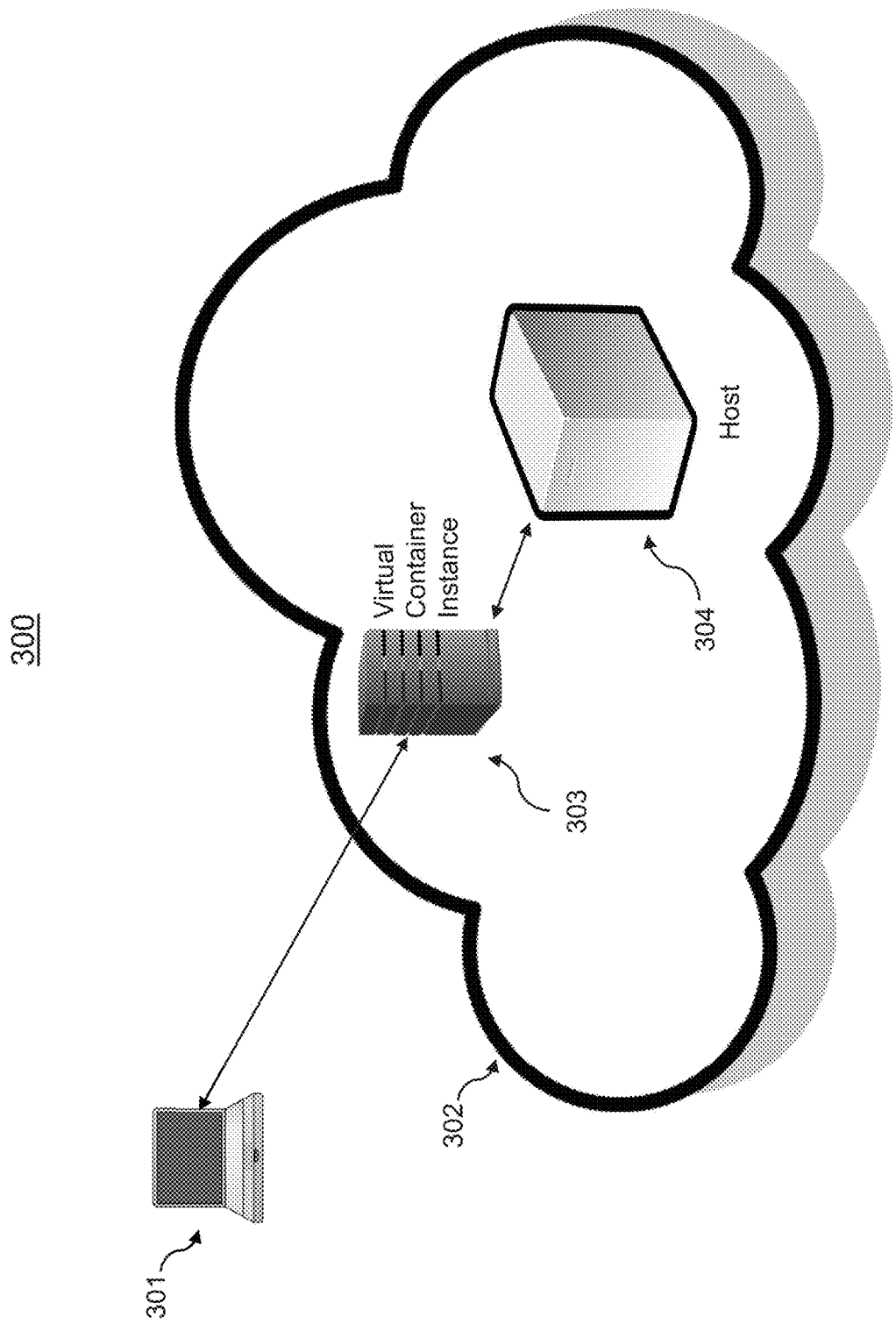
FIG. 3 is a block diagram depicting an exemplary external resource attempting to access a virtual container instance in accordance with disclosed embodiments.

FIG. 3 is a block diagram of a system 300 where an exemplary external resource 301 is attempting to access a virtual container instance 303. Of course, consistent with the above discussion, virtual container instance 303 may be a container, a virtual machine, or other type of virtualized and isolated computing instance. As illustrated, virtual container instance 303 may be spun up in a cloud-based network 302 by a host 304.

Consistent with the above discussion, if the virtual container instance 303 is a default, non-privileged instance, the user or application 301 may be limited to operating within the permitted virtual environment of the virtual container instance 303 itself. On the other hand, if the virtual container instance 303 is a privileged virtual instance (e.g., because one or more of the types of flags discussed above is set, because the virtual container instance 303 has embedded privileges or credentials, etc.), the user or application 301 may attempt to probe the host system 304 itself and potentially gain access to the host system 304, access to other virtual instances supported by the host system 304, or even access to other host instances supported by the host system 304. As discussed above, if the user or application 301 is successful in escaping from the virtualized and isolated environment of the virtual container instance 303 and penetrates the host system 304, the user or application 301 may have expansive privileges to read, write, and modify data and applications running on the host 304 as well as other virtual instances being supported by the host 304. In such a scenario, the threat surface increases vastly when the user or application 301 is able to penetrate the host system 304.

Figure 4:
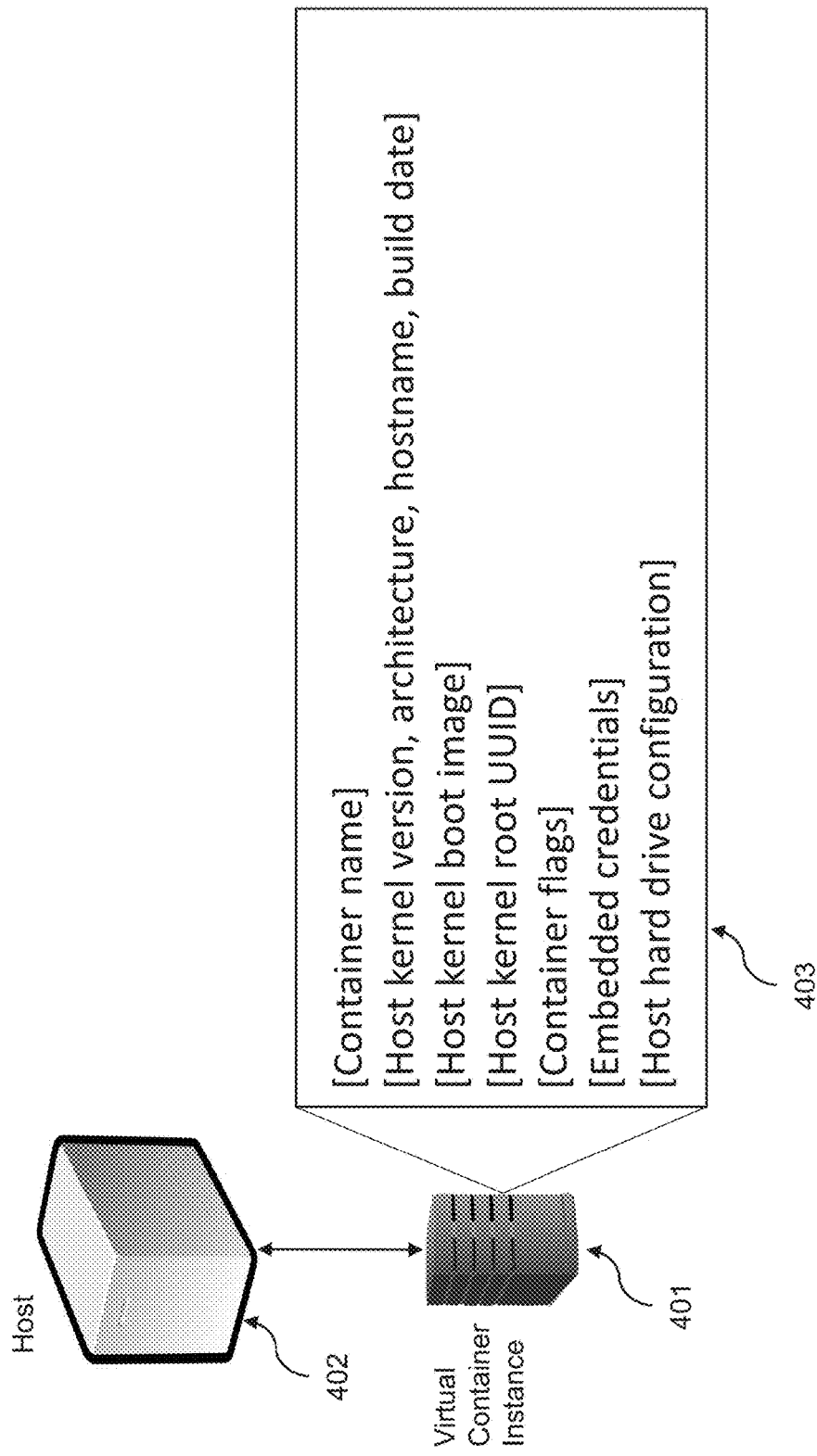
FIG. 4 is a block diagram depicting an exemplary process of a virtual container instance being used to obtain host system information in accordance with disclosed embodiments.

FIG. 4 is a block diagram 400 depicting an exemplary technique of a virtual container instance 401 being used to obtain information regarding the virtual instance 401 and the host system 402. As described herein, when a user or application has access to a virtual instance 401, it may probe the virtual instance 401 or cloud orchestration tools to determine information about the virtual instance 401 as well as the host 402 supporting the virtual instance 401. In some embodiments, detectable information 403 regarding the virtual instance 401 and host 402 may be obtained from a DevOps, continuous development, or continuous deployment process (e.g., Chef™, Puppet™, Jenkins™, Git™, etc.). For example, virtual instances being developed using such tools may be monitored as they are being created, or reports from the tools may be provided as they are being created. In some situations, the probing for information may also be performed using Docker™ or various command-line interface or command language interpreter (CLI) tools (e.g., runc, docker-runc, etc.) In further embodiments, detectable information 403 regarding the virtual instance 401 and host 402 may be gathered or reported from virtualization orchestration tools, such as AWS CloudFormation™, Kubernetes™, Puppet™, Ansible™, Google Cloud Deployment Manager™, Microsoft Azure Formation™, or others. For example, when virtual instances are configured, deployed, requested to be deployed, or updated, such virtualization tools may provide reports regarding detectable information 403. In further embodiments, detectable information 403 may be gathered by inserting a security layer into a virtualization environment running on top of a virtualization platform (e.g., AWS™, Azure™, IBM Cloud™, etc.). Such a custom security layer may detect the creation, deployment, request for deployment, modification, and actions of virtual instances, and gather detectable information 403 based on such events.

Examples of information that may be detected are shown in element 403, and may include the virtual instance's name, the host kernel version, host system architecture, host system namespace, host build date, host kernel boot image, kernel root unique ID (e.g., UUID), various types of virtual instance flags (e.g., as discussed above), embedded credentials, host hard drive or other hardware configuration settings, and various other types of information. Consistent with the above discussion, detectable information 403 may also include the specific information from Tables 1-3.

In different embodiments, the detectable information 403 may be detected and acted upon in several ways, either before, concurrently with, or after spin-up of the virtual instance 401. For example, in a DevOps, continuous development, or continuous deployment environment, new virtual instances may be configured before they are deployed. Developers may, for example, specify what code or applications certain instances should run, what operating systems they should use, what connections parameters they should have vis-à-vis other virtual instances or other network resources, and what security attributes (e.g., flags, privileges, credentials, etc.) they should have. In such environments, before virtual instances are spun up or sent into production, the detectable information 403 may be gathered for each such virtual instance. Likewise, when virtual instances are being configured using a cloud-based platform tool (e.g., AWS™, Azure™, IBM Cloud™, etc.), detectable information 403 may be gathered before instances are spun up. In some embodiments, detectable information 403 is gathered on a continuous basis (e.g., periodically, constantly, etc.). In further embodiments, detectable information 403 is gathered on an event-basis (e.g., upon detecting the configuration of a new virtual instance, a request to spin up or deploy a virtual instance, a request to modify a virtual instance, a requested communication or action by a virtual instance, etc.). In additional embodiments, some of detectable information 403 may be acquired by running a filesystem debugger (e.g., debugfs in Linux environments, xfs_db in XFS environments, etc.). For example, using a debugger, information may be gathered regarding the filesystem structure, hierarchy, and content of the host's filesystem. Once the host's filesystem has been reached, additional commands may be entered to obtain lower levels of information regarding the host (e.g., root level host information, such as the root directory structure, hierarchy, and contents).

In other embodiments, detectable information 403 is acquired after virtual assets are already spun up. For example, such information may be gathered using similar techniques to those discussed above (e.g., continuously and automatically gathering detectable information 403, or gathering such information on an event-basis or trigger-basis).

According to further embodiments, predictive controls may be implemented for detectable information 403 to determine what configurations or parameters are likely to cause privilege risks for virtualized instances. For example, consistent with the above discussion, when certain flags are identified to be set for a virtual instance (e.g., a privilege flag, a PID flag, etc.), those flags may be assigned weights or scores in terms of their likelihood of creating privilege risks. Similarly, the presence or absence of embedded credentials or other secrets in virtual instances may receive weights or scores. Based on such weights or scores, the particular attributes of a given virtualized instance may be analyzed and judged in terms of the particular privilege risk for that virtualized instance. In some embodiments, the scores or probabilities of privilege risk for specific virtual instances are compared to threshold values, which may be used to determine whether to implement a control action for the instances, and if so, what control action to implement. In further embodiments, configuration profiles or categories are created, which may have preset or known scores or probabilities of privilege risk. When detectable information 403 is gathered for virtual instances, such information may be modeled to the closest matching configuration profile or category (e.g., using statistical tools such as "best fit" modeling). When a virtual instance is matched with a particular configuration profile or category, the score or probability of privilege risk for that profile or category may be used to determine whether to perform a control action for the virtual instance, and if so, what control action to perform. In further embodiments, such configuration profiles and categories may be adjustable either manually by administrators, or automatically based on machine learning in the cloud-based network.

Figure 5:
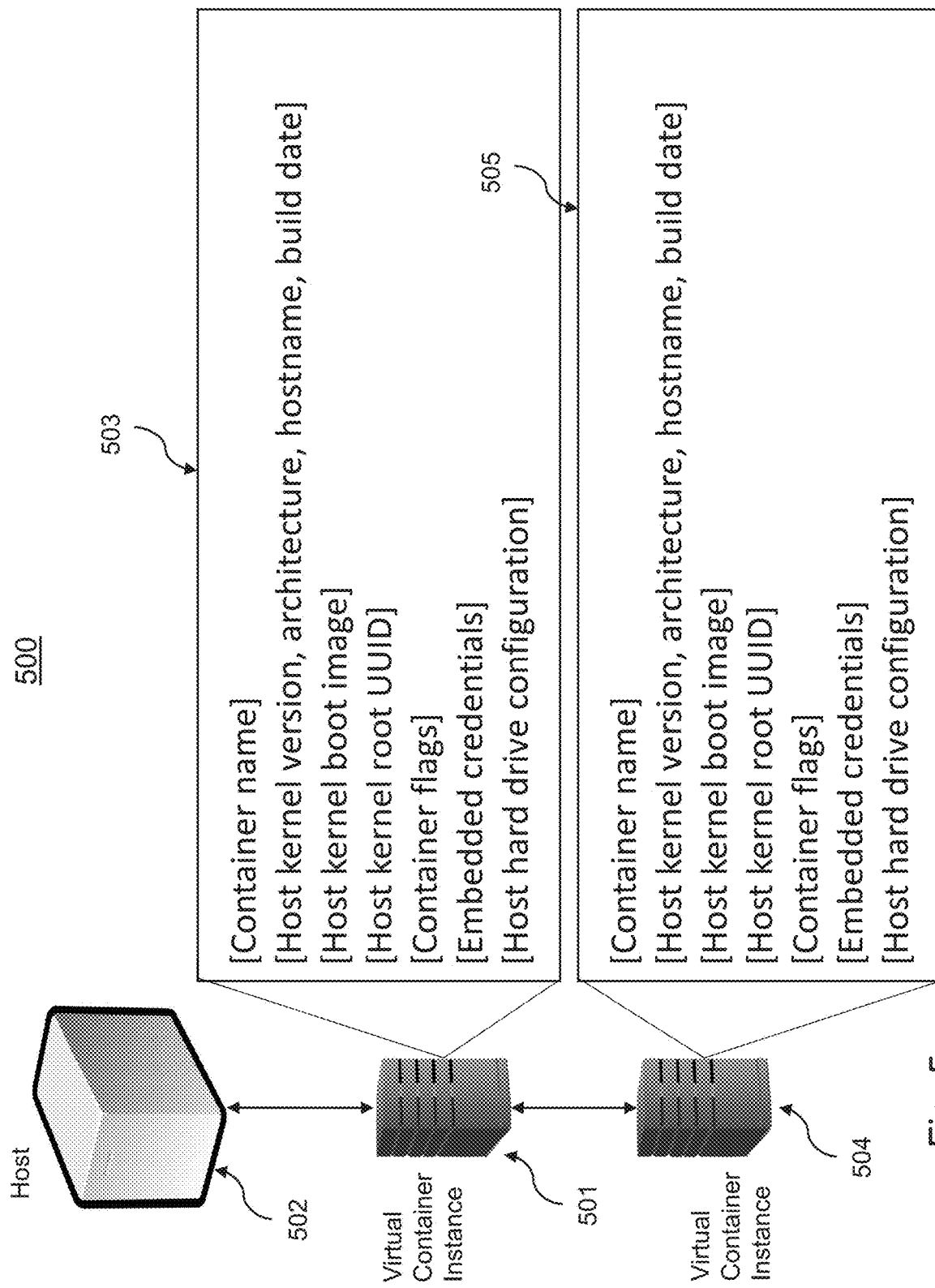
FIG. 5 is a block diagram depicting an exemplary process of a virtual container instance obtaining access to another virtual container instance, in order to obtain host system information in accordance with disclosed embodiments.

FIG. 5 illustrates a variation on the system of FIG. 4, where rather than there being one virtual instance 501 being examined there are multiple virtual instances 501/504 being examined. In system 500, for example, virtual instance 501 may have privileges, permissions, or credentials giving it access to virtual container instance 504. In some situations, even if virtual container 501 is not itself privileged (e.g., has no privilege flags or credentials, or does not match a privilege profile), virtual instance 504 may be privileged. In this situation, because virtual instance 501 has access to virtual instance 504, a user of virtual instance 501 may be able to operate on or exploit virtual instance 504 to obtain access to the host system 502 underlying virtual instances 501 and/or 504. For example, the user may probe the detectable information 503 available from virtual instance 501, discover that the detectable information references virtual instance 504 (e.g., by name, by identifier, by network address, etc.), and may then access virtual instance 504 and probe detectable information 505 regarding virtual instance 504 and host 502.

As discussed above, once a user is able to penetrate the host system 502 using any privileged virtual instance, the user may inflict widespread damage throughout the host system 502 and throughout the virtual instances running on the host 502. Accordingly, system 500 illustrates an indirect approach to privilege escalation and host penetration prevention, where the dangers of such attacks may be equally severe as the direct types of attacks discussed above.

FIG. 6 is a flowchart depicting an exemplary process for identifying vulnerabilities for virtualized and isolated execution instances to escape their operating environment and threaten a host environment. Process 600 may be performed, for example, in the system environments of FIGS. 1, 3, 4, and 5, with virtual instances such as those described in connection with FIG. 2. Notably, process 600 may be performed before, concurrently with, or after virtual instances are deployed or spun up in a virtualized environment.

Process 600 may include an operation 601 of identifying a virtualized and isolated execution instance configured for deployment on a host in a virtual computing environment. As discussed above, there are several ways in which such a virtualized instance (e.g., virtual machine, container, next-generation container, etc.) may be identified. For example, during a DevOps, continuous development, or continuous deployment process, a new virtual instance being configured or deployed may be identified. The new instance may be identified by intercepting a call to create a new virtual instance (e.g., at the docker-runc layer), through a scan of the virtual instance's image, through a scan of a development environment using tools such as Chef™, Puppet™, Jenkins™, Git™, etc., or from a report from such tools regarding the configuration, deployment, or request to deploy the new virtual instance. In some implementations, the scanning operations may be performed once the call to create the instance is intercepted. As another example, in a cloud-based environment, tools such as AWS CloudFormation™, Kubernetes™, Puppet™, Ansible™, Google Cloud Deployment Manager™, Microsoft Azure Formation™, or others may be used to scan the cloud environment or to identify requests to configure, deploy, or modify virtual instances. As a further example, operation 601 may be performed after virtual instances have been spun up. For example, virtual instances may be identified while deployed based on their attempts to communicate, attempts to perform actions on other virtual instances or on a host system, attempts to change their configuration settings, or attempts made from outside to modify the instances. Such runtime activities are further addressed in connection with FIG. 7.

Process 600 may also include an operation 602 of performing a privileged configuration inspection for the virtualized execution instance. Consistent with the above discussion, operation 602 may be performed before an instance is spun up or deployed (e.g., during a development phase), concurrently with deployment (e.g., triggered based on a request to deploy), or following deployment (e.g., based on an activity trigger). Various types of specific events may be used as triggers to perform the privileged configuration inspection of operation 602. For example, the inspection may occur based on an attempt to create a new virtual instance, duplicate an existing virtual instance, configure or reconfigure a virtual instance, change permissions of a virtual instance, change dependencies between two or more virtual instances, apply a security profile or setting to a virtual instance, embed credentials into a virtual instance, change code or functionality of a virtual instance, deploy a virtual instance, or request deployment of a virtual instance, among various others. Through these various types of triggers for performing the privileged configuration inspection, even relatively rare but sensitive risks may be detected (e.g., when a new privileged process is created within a non-privileged container instance, such as through use of the "docker exec—it —privileged" Docker™ command, a privileged configuration inspection may consequently be performed and the privilege risk may be detected. Alternatively, the inspection may occur continuously or periodically.

The privileged configuration inspection may include analyzing whether the virtualized and isolated execution instance has been configured with one or more attributes that can permit operation of the virtualized execution instance to perform operations, beyond an environment of the virtualized execution instance, on an environment of the host. For example, as discussed above in connection with FIGS. 4-5, various types of information regarding the virtual instance may be obtained through an analysis of the configuration settings of the virtual instance, through use of a filesystem debugger (e.g., debugfs, xfs_db, etc.), through a report from a development (e.g., DevOps) platform tool, through a report from a virtual network application (e.g., AWS CloudFormation™, Kubernetes™, etc.), or through other techniques. Consistent with the discussion above, the privileged configuration inspection may involve a binary decision (e.g., whether or not a particular privilege flag is set) or may involve identifying a level of privileged capabilities on a continuum based on one or more parameters for the virtual instance (e.g., based on the scores and probabilities discussed above).

As discussed above, the privilege inspection may involve analyzing in operation 603 whether particular privilege flags are set for a virtual instance, whether particular permissions are given to the virtual instance, whether embedded secrets or other credentials are included in or accessible to the virtual instance, etc. Further, in some embodiments, scores or probabilities of privilege risk may be given to virtual instances. As discussed above, particular configuration parameters (e.g., flags, permissions, credentials, etc.) may be given scores and/or weights, which are used to compute an overall score or probability score for the virtual instances. The score or probability of privilege risk may then be compared to a threshold to determine whether to perform a control action for the virtual instance, and if so, what control action to take, as discussed further below. In additional embodiments, profiles or categories of privileged virtual instances may be developed. For example, the profiles or categories may be developed by administrators, third parties specializing in virtual instance security, or through a machine-learning process based on observing the creation and activity of virtual instances over time. When a virtual instance is then identified (in operation 601), the virtual instance may be compared (e.g., statistically modeled) to a profile or category for privileged instances. If a match (or near-match) is found, the identified virtual instance may be treated as part of the profile or category. Consequently, if a security policy specifies a particular control action for the profile or category, as discussed further below, that control action may be applied to the virtual instance.

If in operation 603 a virtual instance is deemed to be a privileged identity (e.g., through the analysis above), process 600 may proceed to operation 605 and a control action may be taken for the instance. On the other hand, if the profile or category is associated with a default or non-privileged instance, process 600 may proceed to operation 604 and a control action may be unnecessary. For example, operation 604 may include taking no action and letting the virtual instance be spun up, deployed, modified, or operated.

Process 600 may further include an operation 606 of determining whether the virtual instance being investigated is able to access additional virtual instances. For example, consistent with the discussion above regarding FIG. 5, one virtual instance may be non-privileged when considered in isolation, but when considered in terms of its overall environment it may have access to a privileged virtual instance. In that event, both virtual instances may be considered privileged based on an analysis of their detectable information, since the first virtual instance may be able to escalate its privileges or exploit the second virtual instance to penetrate the host environment. Accordingly, in process 600, if the virtual instance being analyzed is capable of accessing additional other virtual instances in operation 606, process 600 may continue with further iterations of operation 603 for those additional virtual instances. For each such virtual instance, based on the analysis in operation 603, process 600 may either find no privileged virtual instance and proceed to operation 604, or may find a privileged virtual instance and decide on a control action in operation 605.

FIG. 7 is a flowchart depicting an exemplary process for identifying runtime activity that may allow virtualized execution instances to escape their operating environment and threaten a host environment. Like process 600, process 700 may be performed in the system environments of FIGS. 1, 3, 4, and 5, with virtual instances such as those described in connection with FIG. 2.

In an operation 701, process 700 may include detecting runtime operation activities by a virtual instance that is running in a cloud-based network. In some embodiments, for example, certain predetermined actions may be deemed sensitive to security and may lead to a privileged configuration inspection in operation 702. Examples may include changing the virtual instance parameters (e.g., flag settings, permissions, embedded credentials, etc.), changing the dependencies or access rights among two or more virtual instances, applying or modifying a security policy to the virtual instance, attempting to access a host system filesystem, attempting to write or modify data or applications running on the host system, etc.

When such sensitive actions are detected during runtime of a virtual instance in operation 701, process 700 may proceed to operation 702 of performing a privileged configuration inspection for the virtual instance. Operation 702 may be substantially similar to operation 602, as discussed above, including analyzing in operation 703 whether the virtual instance is capable of operating on the underlying host environment. If the virtual instance is determined to be capable of operating on the host environment (e.g., penetrating the filesystem of the host, or even the root directory of the host), process 700 may proceed to operation 705 and implement a control action for the runtime activity of the virtual instance. Alternatively, if no privileged risk is found for the runtime activity or the virtual instance, process 700 may proceed to operation 704 and permit the runtime activity to continue.

In operation 605 of process 600, and operation 705 of process 700, various types of control actions are possible. In some embodiments, a security policy may determine whether to perform a control action, and if so, what control action to apply. Examples of control actions include permitting or blocking a virtual instance to proceed from development into deployment, to be spun up, to be configured or reconfigured, to have new or different dependencies with other virtual instances, to operate in a cloud environment, generating an alert based on the virtual instance, generating a report based on the virtual instance, requiring second-tier (e.g., administrator) approval or additional (e.g., two-factor) authentication, etc.

Consistent with the above discussion, the security policy may dictate certain situations in which a virtual instance is automatically classified as privileged and a control action is taken. As an illustration, if the "privileged" or "PID flag" is set for the virtual instance, the instance may be deemed privileged and a control action may be taken (e.g., requiring second-tier approval or authentication, generating an alert, etc.). Alternatively, as discussed above, scores or probabilities may be assigned to virtual instances based on the individual parameters associated with them (e.g., based on flag settings, permissions, embedded credentials, etc., each of which may have a corresponding weight). For scores or probabilities above a particular threshold, virtual instances may be considered privileged and an appropriate control action may be taken.

In some embodiments, multiple thresholds may be used. For example, a score or probability below a first threshold may indicate that a virtual instance is non-privileged and may operate or be deployed without restriction, a score or probability between a first and second threshold may mean that an alert should be generated, and a score or probability above the second threshold may mean that the virtual instance is blocked from deployment or authentication should be required prior to deployment. Further, in embodiments where virtual instances are modeled to predefined profiles or categories of virtual instances, the privileged status of the virtual instance may be based on such modeling. For example, various profiles or models may be created to correspond to specific privileged risk attributes. Some profiles or categories may be associated with non-privileged instances, others may be associated with highly or completely privileged instances, and still others may fall in the middle with some level of privileged risk below complete or full risk. According to the security policy, when a virtual instance is modeled or matched to a particular profile or category, the profile or category may have a corresponding control action that is applied. Using such profiles or categories, techniques may be applied for predictive privilege classification. For example, as a virtual instance is being developed or configured (e.g., in a DevOps environment), the privileged inspection discussed above may be run. As different parameters for the virtual instance are set, the virtual instance may be continuously modeled or matched to the profiles or categories. Accordingly, real-time privilege inspection may be performed for the virtual instance throughout the development and production cycles. Consistent with the above discussion, real-time control actions may correspondingly be applied during development and production as well.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for identifying vulnerabilities for virtualized execution instances to escape their operating environment and threaten a host environment, the operations comprising:

identifying a virtualized execution instance configured for deployment on a host in a virtual computing environment;

performing a privileged configuration inspection for the virtualized execution instance, the privileged configuration inspection determining a probability of privilege risk by analyzing whether the virtualized execution instance has been configured with one or more configuration parameters that can permit operation of the virtualized execution instance to perform operations on an environment of the host beyond an environment of the virtualized execution instance, wherein the probability of privilege risk is based on weights or scores of the one or more configuration parameters; and taking a preventative action with respect to the virtualized execution instance based on the privileged configuration inspection and the probability of privilege risk, the preventative action comprising at least one of:

reporting the probability of privilege risk, neutralizing the probability of privilege risk, identifying the virtualized execution instance with the probability of privilege risk, generating an alert for the virtualized execution instance with the probability of privilege risk, monitoring operations performed by the virtualized execution instance with the probability of privilege risk, determining a control action in reaction to the probability of privilege risk to control the virtualized execution instance's ability to perform operations on the environment of the host, disabling one or more credentials associated with the virtualized execution instance with the probability of privilege risk, or generating a prompt requiring an authentication or authorization.

2. The non-transitory computer readable medium of claim 1, wherein the virtualized execution instance is a container instance.

3. The non-transitory computer readable medium of claim 1, wherein the privileged configuration inspection includes identifying a second virtualized execution instance accessible to the virtualized execution instance, and analyzing whether the second virtualized execution instance has been configured with one or more configuration parameters that can permit operations on the environment of the host.

4. The non-transitory computer readable medium of claim 1, wherein the virtualized execution instance has not been deployed for execution in the virtual computing environment.

5. The non-transitory computer readable medium of claim 1, wherein the one or more configuration parameters include a configuration parameter for the virtualized execution instance.

6. The non-transitory computer readable medium of claim 1, wherein the one or more configuration parameters include a hardware configuration of the host.

7. The non-transitory computer readable medium of claim 1, wherein performing the privileged configuration inspection includes using a file system debugger to attempt to access a directory of the host.

8. The non-transitory computer readable medium of claim 1, wherein the operations further comprise, conditional on performing the privileged configuration inspection during a docker phase of the virtualized execution instance, deploying the virtualized execution instance.

9. The non-transitory computer readable medium of claim 1, wherein the operations further comprise, conditional on performing the privileged configuration inspection upon a request to deploy the virtualized execution instance, deploying the virtualized execution instance.

10. The non-transitory computer readable medium of claim 1, wherein the operations further comprise, conditional on performing the privileged configuration inspection upon a request to create the virtualized execution instance, deploying the virtualized execution instance.

11. A computer-implemented method for identifying vulnerabilities for virtualized execution instances to escape their operating environment and threaten a host environment, the method comprising:

identifying a virtualized execution instance configured for deployment on a host in a virtual computing environment;

performing a privileged configuration inspection for the virtualized execution instance, the privileged configuration inspection determining a probability of privilege risk by analyzing whether the virtualized execution instance has been configured with one or more configuration parameters that can permit operation of the virtualized execution instance to perform operations on an environment of the host beyond an environment of the virtualized execution instance, wherein the probability of privilege risk is based on weights or scores of the one or more configuration parameters; and taking a preventative action with respect to the virtualized execution instance based on the privileged configuration inspection and the probability of privilege risk, the preventative action comprising at least one of:

reporting the probability of privilege risk, neutralizing the probability of privilege risk, identifying the virtualized execution instance with the probability of privilege risk, generating an alert for the virtualized execution instance with the probability of privilege risk, monitoring operations performed by the virtualized execution instance with the probability of privilege risk, determining a control action in reaction to the probability of privilege risk to control the virtualized execution instance's ability to perform operations on the environment of the host, disabling one or more credentials associated with the virtualized execution instance with the probability of privilege risk, or generating a prompt requiring an authentication or authorization.

12. The computer-implemented method of claim 11, further comprising detecting a runtime operation by the virtualized execution instance and, upon detecting the runtime operation, performing a further privileged configuration inspection for the virtualized execution instance.

13. The computer-implemented method of claim 12, wherein the runtime operation involves an inspection of the host.

14. The computer-implemented method of claim 12, wherein the runtime operation involves an inspection of hardware of the host.

15. The computer-implemented method of claim 12, wherein the runtime operation involves an attempt to access a root directory of the host.

16. The computer-implemented method of claim 12, wherein the runtime operation involves an attempt to execute code on the host.

17. The computer-implemented method of claim 11, wherein performing the privileged configuration inspection includes using a file system debugger to attempt to access a directory of the host.

18. The computer-implemented method of claim 11, further comprising, conditional on performing the privileged configuration inspection during a docker phase of the virtualized execution instance, deploying the virtualized execution instance.

19. The computer-implemented method of claim 12, wherein the runtime operation involves a write operation on the host.

20. The computer-implemented method of claim 11, wherein the one or more configuration parameters include a configuration parameter for the virtualized execution instance that was determined at a time of creation of the virtualized execution instance.

\* \* \* \* \*